US012717540B2

(12) United States Patent
Varekamp et al.

(10) Patent No.: US 12,717,540 B2
(45) Date of Patent: Aug. 25, 2026

(54) APPARATUS AND METHOD FOR GENERATING AN AUDIO SIGNAL

(71) Applicant: KONINKLIJKE PHILIPS N.V., Eindhoven (NL)

(72) Inventors: Christiaan Varekamp, Veldhoven (NL); Jeroen Gerardus Henricus Koppens, Nederweert (NL)

(73) Assignee: Koninklijke Philips N.V., Eindhoven (NL)

( * ) Notice: Subject to any disclaimer, the term of this patent is extended or adjusted under 35 U.S.C. 154(b) by 163 days.

(21) Appl. No.: 18/285,657

(22) PCT Filed: Mar. 29, 2022

(86) PCT No.: PCT/EP2022/058273
§ 371 (c)(1),
(2) Date: Oct. 5, 2023

(87) PCT Pub. No.: WO2022/214357
PCT Pub. Date: Oct. 13, 2022

(65) Prior Publication Data

US 2024/0370223 A1 Nov. 7, 2024

(30) Foreign Application Priority Data

Apr. 8, 2021 (EP) .................................... 21167514

(51) Int. Cl.
*G06F 3/16* (2006.01)
*G06F 3/01* (2006.01)
(Continued)

(52) U.S. Cl.
CPC ................ *G06F 3/16* (2013.01); *G06F 3/011* (2013.01); *G06T 7/70* (2017.01); *G06T 19/006* (2013.01);
(Continued)

(58) Field of Classification Search
CPC . G06F 3/16; G06F 3/167; G06F 3/011; G06F 3/04815; G06F 3/0346;
(Continued)

(56) References Cited

U.S. PATENT DOCUMENTS 11,651,567 B2 5/2023 Shiokwa et al.
2013/0236040 A1 9/2013 Crawford et al.
(Continued)

OTHER PUBLICATIONS

International Search Report and Written Opinion from PCT/EP2022/058273 mailed May 24, 2022.
(Continued)

*Primary Examiner* — Xilin Guo

(57) ABSTRACT

An apparatus comprises a first receiver (201) receives a real time image sequence of depth and/or visual data from an image sensor. A second receiver (209) receives a set of audio objects and metadata indicative of links between audio objects and material characteristics. An image generator (203) generates an output image sequence comprising an image object corresponding to a virtual scene object in the real world scene and a detector (205) detects an interaction between the virtual scene object and a real world scene object of a real world scene. An estimator (207) determines a material property for the real world scene object in response to image data of the sequence of image frames and a selector (211) selects an audio object in response to the material property and material characteristics linked to the set of audio objects. An output circuit (213) generates the output audio signal comprising the first audio object.

20 Claims, 3 Drawing Sheets

(51) Int. Cl.
*G06T 7/70* (2017.01)
*G06T 19/00* (2011.01)
*G06V 10/22* (2022.01)
*G06V 20/20* (2022.01)
*G06V 20/40* (2022.01)

(52) U.S. Cl.
CPC .............. *G06V 10/22* (2022.01); *G06V 20/20* (2022.01); *G06V 20/40* (2022.01); *G06T 2207/10016* (2013.01)

(58) Field of Classification Search
CPC ........ G06V 20/40; G06V 10/22; G06V 20/20; G06V 10/764; G06V 20/64; G06T 19/006; G06T 7/70; G06T 2207/10016; G06T 19/20; G06T 7/20
See application file for complete search history.

(56) References Cited

U.S. PATENT DOCUMENTS

| | | | | |
|---|---|---|---|---|
| 2018/0374276 | A1* | 12/2018 | Powers | G06T 17/205 |
| 2019/0259205 | A1* | 8/2019 | Nissinen | G02B 27/017 |
| 2020/0344563 | A1* | 10/2020 | Mate | G06F 3/167 |
| 2021/0082191 | A1 | 3/2021 | Tajik | |
| 2021/0201855 | A1* | 7/2021 | Kammachi-Sreedhar | H04N 13/183 |
| 2021/0209855 | A1 | 7/2021 | Stokking et al. | |
| 2021/0375257 | A1* | 12/2021 | Tajik | G06V 20/20 |
| 2021/0405743 | A1* | 12/2021 | Boesel | G06N 3/08 |

OTHER PUBLICATIONS

Correa Ana et al: “GenVirtual: An Augmented Reality Musical Game for Cognitive and Motor Rehabilitation”, Virtual Rehabilitation, 2007, Sep. 1, 2007 (Sep. 1, 2007), pp. 1-6.

Tracking and Visual Planes, Apple. com (downloaded Aug. 7, 2023).

Tsugi’s GameSynth (http://tsugi-studio.com/web/en/products-gamesynth.html) downloaded Aug. 7, 2023.

* cited by examiner

APPARATUS AND METHOD FOR GENERATING AN AUDIO SIGNAL

CROSS-REFERENCE TO PRIOR APPLICATIONS

This application is the U.S. National Phase application under 35 U.S.C. § 371 of International Application No. PCT/EP2022/058273, filed on Mar. 29, 2022, which claims the benefit of EP Patent Application No. EP21167514.5, filed on Apr. 8, 2021. These applications are hereby incorporated by reference herein.

FIELD OF THE INVENTION

The invention relates to an apparatus and method for generating an audio signal for interactions between virtual and real world scene objects, and in particular, but not exclusively, for generating an audio signal for Augmented Reality applications.

BACKGROUND OF THE INVENTION

The variety and range of experiences based on audiovisual content have increased substantially in recent years with new services and ways of utilizing and consuming such content continuously being developed and introduced. In particular, many spatial and interactive services, applications and experiences are being developed to give users a more involved and immersive experience.

Examples of such applications are Virtual Reality (VR), Augmented Reality (AR), and Mixed Reality (MR) applications, which are rapidly becoming mainstream, with a number of solutions being aimed at the consumer market. A number of standards are also under development by a number of standardization bodies. Such standardization activities are actively developing standards for the various aspects of VR/AR/MR systems including e.g. streaming, broadcasting, rendering, etc.

VR applications tend to provide user experiences corresponding to the user being in a different world/environment/scene whereas AR (including Mixed Reality MR) applications tend to provide user experiences corresponding to the user being in the real local environment but with additional information or virtual objects or information being added. Thus, VR applications tend to provide a fully immersive synthetically generated world/scene whereas AR applications tend to provide a partially synthetic world/scene which is overlaid the real scene in which the user is physically present. However, the terms are often used interchangeably and have a high degree of overlap. In the following, the term Augmented Reality/AR will be used to denote both Augmented Reality and Mixed Reality (as well as some variations sometimes denoted Virtual Reality).

As an example, services and applications for augmented reality using handheld devices have become increasingly popular and software APIs (Application Programming Interfaces) and toolkits, such as ARKit (developed by Apple Inc.) and ARCore (developed by Google Inc.) have been introduced to support augmented reality applications on smart phones and tablets. In these applications, built-in cameras and other sensors of the devices are used to generate real-time images of the environment with virtual graphics overlaying the presented images. Applications may for example generate a live video feed with graphic objects overlaying the live video. Such graphic objects may for example be used to position virtual objects so that they are perceived to be present in the real world scene.

As another example, headsets and glasses have been developed where the real world scene may be viewed directly through AR glasses but with these also being capable of generating images that are seen by the user when looking through the glasses. This may also be used to present virtual images that are perceived to be part of the viewed real-world scene. Motion sensors are used to track the head movements and the presented virtual object may be adapted correspondingly to provide an impression of the virtual object being a real-world object viewed in the real world.

The approaches are respectively known as pass-through and see-through and both may provide a novel and exciting user experience.

In addition to the visual rendering, some AR applications may provide a corresponding audio experience. In addition, to the visual experience, it has been proposed to provide audio that may correspond to virtual objects. For example, if a virtual object is one that would generate a noise, the visual presentation of the object may be supplemented by a corresponding sound being generated. In some cases, a sound may also be generated to reflect an action for the virtual object.

Typically, the sound is generated as a default sound by rendering a pre-recorded audio clip at appropriate times. The sound may in some cases be adapted to reflect the current environment, such as for example by adapting the perceived reverberation depending on the current environment, or may e.g. be processed to be perceived to arrive from a position corresponding to the perceived position of the virtual object in the real world. Often such positioning may be achieved by binaural processing to generate a suitable headphone audio output.

However, although such approaches may provide an interesting application and user experience in many embodiments, conventional approaches tend to be suboptimal, and tend to be difficult to implement and/or tend to provide suboptimal performance and user experiences.

Hence, an improved approach would be advantageous. In particular, an approach of generating an audio signal that allows improved operation, increased flexibility, reduced complexity, facilitated implementation, an improved audio experience, improved audio quality, reduced computational burden, improved suitability and/or performance for mixed/augmented reality applications, improved user immersion, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for generating an output audio signal, the apparatus comprising: a first receiver arranged to receive a real time image sequence of a real world scene from an image sensor, the real time image sequence comprising a sequence of image frames, each image frame comprising at least one of visual image data and depth image data; a second receiver arranged to receive a set of audio objects and metadata for audio objects of the set of audio objects, the metadata being indicative of links between audio objects of the set of audio objects and material characteristics: an image generator arranged to generate an output image sequence comprising an image object corresponding to a virtual scene object in the real world scene: a detector arranged to detect an interaction between the virtual scene object and a real world scene object of the real world scene in response to a detection of a proximity between the virtual scene object and the real world scene object: an estimator arranged to determine a material property for the real world scene object in response to image data of the sequence of image frames: a selector arranged to select a first audio object of the set of audio objects in response to the material property and the material characteristics linked to audio objects of the set of audio objects; and an output circuit arranged to generate the output audio signal comprising the first audio object.

The invention may provide an improved user experience in many embodiments and may in particular in many embodiments provide an improved and more immersive Augmented Reality experience. The approach may in many embodiments be achieved while maintaining low complexity and/or implementation. The approach may be highly suitable for an AR system where audio and supporting metadata may be provided by a remote server. The approach may facilitate and/or support a system where a centralized server may provide support for a number of remote clients and may substantially facilitate implementation of the remote client. The approach may support a centralized generation and management of audio for enhancing an AR application and experience.

The audio objects may be audio clips/fragments/etc. and may be represented in any suitable way. In many embodiments, each audio object may represent a sound in a time interval. In many embodiments, the time interval may not exceed 5 seconds, 10 seconds, or 20 seconds for any of the audio objects.

The material characteristics may be material characteristics of real world objects.

The output image sequence may comprise visual images.

The interaction may be detected in a three dimensional coordinate system representing the real world scene. The interaction may be a proximity/collision/contact between the virtual scene object and the real world scene object.

The apparatus may be an augmented reality apparatus. The apparatus may be an apparatus for providing an output image sequence and output audio signal for an augmented reality application. The augmented reality application may present a virtual scene object in a real world scene.

According to an optional feature of the invention, the estimator is arranged to: determine an interaction image region in at least one image frame of the sequence of image frames, the interaction image region being an image region of the at least one image frame in which the interaction occurs; and determine the material property for the scene object in response to image data of the interaction image region.

This may provide a particularly efficient and/or advantageous material property estimation in many embodiments, and may specifically allow a more accurate material property estimation in many embodiments. The approach may provide an improved user experience as a result.

According to an optional feature of the invention, the second receiver is arranged to receive the metadata from a remote server.

The approach may provide a particularly efficient application where audio may be remotely, and possibly centrally, generated and managed while being effectively adapted locally to the appropriate current conditions.

According to an optional feature of the invention, the metadata for at least some audio objects comprises indications of links between the at least some audio objects and material characteristics of real world scene objects and links between the at least some audio objects and material characteristics of virtual scene objects; and wherein the selector is arranged to select the first audio object in response to the material property and material characteristics of real world objects linked to the set of audio objects and in response to a material property of the virtual scene object and material characteristics of virtual scene objects linked to the set of audio objects.

This may allow improved performance in many embodiments and may specifically allow improved adaptation to the specific interaction. A more immersive user experience may often be achieved.

According to an optional feature of the invention, the selector is arranged to select the first audio object in response to a dynamic property of the virtual scene object.

This may allow improved performance in many embodiments and may specifically allow improved adaptation to the specific interaction. A more immersive user experience may often be achieved.

According to an optional feature of the invention, the detector is arranged to determine a property of the interaction and the selector is arranged to select the first audio object in response to the property of the interaction.

This may allow improved performance in many embodiments and may specifically allow improved adaptation to the specific interaction. A more immersive user experience may often be achieved.

According to an optional feature of the invention, the property of the interaction is at least one property selected from the group of: a speed of the interaction: a force of a collision between the virtual scene object and the real world scene object: an elasticity of a collision between the virtual scene object and the real world scene object: a duration of the interaction; and a direction of movement of the virtual scene object relative to the real world scene object.

According to an optional feature of the invention, the selector is arranged to select the first audio object in response to an orientation of the virtual object relative to the real world scene object.

This may allow improved performance in many embodiments and may specifically allow improved adaptation to the specific interaction. A more immersive user experience may often be achieved.

According to an optional feature of the invention, the estimator is arranged to determine a match indication for the real world scene object to at least a first category out of a plurality of object categories; and to determine the material property in response to the match indication and material properties linked to the object categories.

This may provide a particularly advantageous and often lower complexity determination of a material property which however may still be of high accuracy. In many embodiments, the categorization/classification may advantageously be achieved using a neural network.

According to an optional feature of the invention, the apparatus further comprises an audio receiver for receiving an audio signal of real time audio captured in the real world scene, and wherein the estimator is arranged to determine the match indication in response to the audio signal.

Such an approach may in many embodiments substantially improve the accuracy of the material property estimating leading to improved overall performance.

According to an optional feature of the invention, the selector is arranged to select the first audio object as a default audio object if no audio object is detected for which a selection criterion is met.

According to an optional feature of the invention, at least one image frame comprises depth image data and wherein the estimator is arranged to determine the material property for the real world scene object in response to a detection that at least part of an image region of the at least one image frame representing the real world scene object has a confidence level for depth image data that does not exceed a threshold.

In some embodiments, the image frame comprises visual image data and depth image data and the estimator is arranged to determine the real world scene object to have a metallic component in response to a detection that for at least part of the image region a brightness of the visual image data exceeds a threshold and a confidence level for depth image data does not exceed a threshold.

According to another aspect of the invention, there is provided a method of generating an output audio signal, the method comprising: receiving a real time image sequence of a real world scene from an image sensor, the real time image sequence comprising a sequence of image frames, each image frame comprising at least one of visual image data and depth image data: receiving a set of audio objects and metadata for audio objects of the set of audio objects, the metadata being indicative of links between audio objects of the set of audio objects and material characteristics: generating an output image sequence comprising an image object corresponding to a virtual scene object in the real world scene; detecting an interaction between the virtual scene object and a real world scene object of the real world scene in response to a detection of a proximity between the virtual scene object and the real world scene object; determining a material property for the real world scene object in response to image data of the sequence of image frames: selecting a first audio object of the set of audio objects in response to the material property and the material characteristics linked to audio objects of the set of audio objects; and generating the output audio signal comprising the first audio object.

The method may include displaying the output image sequence and/or rendering the output audio signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description will focus on generation of an audio signal to supplement image generation of a virtual object in a real world scene as part of an augmented reality application. However, it will be appreciated that the described principles and concepts may be used in many other applications and embodiments.

Augmented reality experiences allowing a virtual information and objects to be presented to supplement a real-world environment are becoming increasingly popular and services are being developed to satisfy such a demand.

In many approaches, the AR application may be provided locally to a viewer by e.g. a stand-alone device that does not use, or even have any access to, any remote AR server. However, in other applications, an AR application may be based on data received from a remote or central server. For example, audio or graphic data may be provided to the AR device from a remote central server and may be locally processed to generate a desired AR experience.

Figure 1:
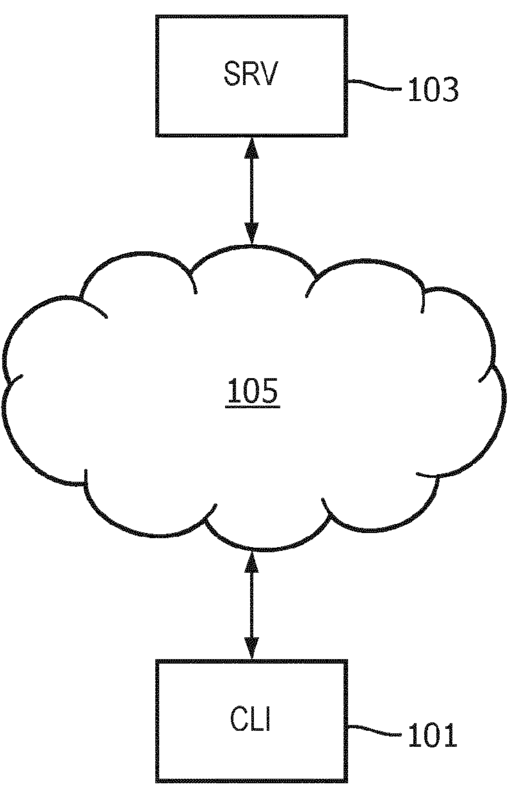
FIG. 1 illustrates an example of elements of an augmented reality system.

FIG. 1 illustrates such an example of an AR system in which a remote AR client device 101 liaises with an AR server 103 e.g. via a network 105, such as the Internet. The server 103 may be arranged to simultaneously support a potentially large number of client devices 101.

The AR server 103 may for example support an augmented experience by transmitting data defining elements of a virtual environment and objects to the client device 101. The data may specifically describe visual features and geometric properties of a number of virtual objects that may be used by the client device 101 to generate overlay graphics that can be presented to a user. In some embodiments, the data may also include various information that can be presented to the user. Further, the server 103 may provide audio data to the client device 103 that can be used to locally generate virtual sounds/audio that may further enhance the user experience and specifically the immersion.

Figure 2:
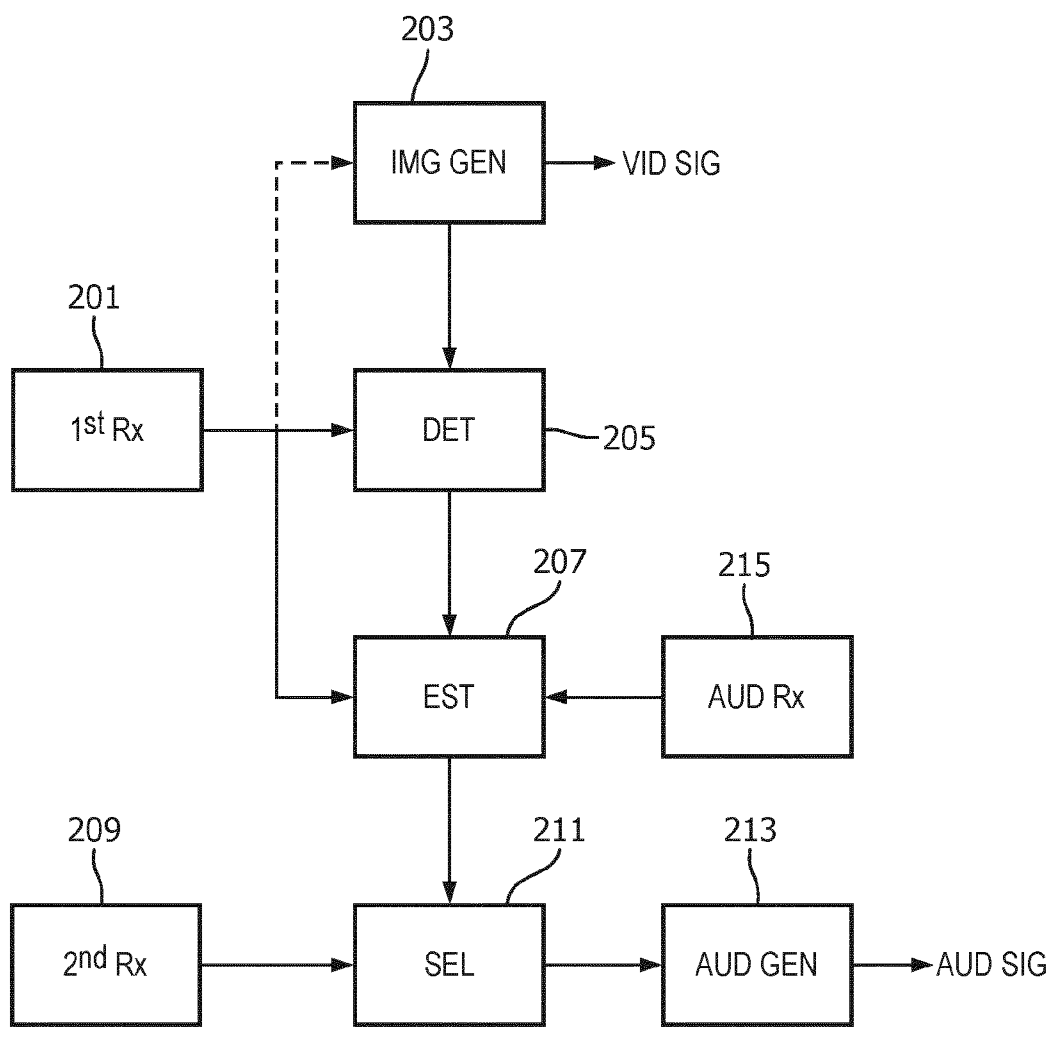
FIG. 2 illustrates an example of an audio apparatus for generating an output audio signal in accordance with some embodiments of the invention.

FIG. 2 illustrates a device in accordance with some embodiments of the invention. The device may specifically be a client device 101 of FIG. 1 and will be described with reference to such an embodiment.

The apparatus comprises a first receiver 201 which is arranged to receive image data from one or more images sensors. The image data from an image sensor specifically comprises a real time image sequence of frames/images of a real world scene.

In many embodiments the frames may comprise visual image data from a visual image camera. The frames/image data may comprise a real time sequence of visual images where each pixel represents a received light intensity from a view direction of the pixel. Each pixel may for example include a set of light brightness/intensity values for a (possibly weighted) interval of the visible spectrum. For example, the pixel values of the visual images may represent one or more brightness levels, such as e.g. a set of color channel brightness/intensity values. For example, the images may be RGB-images. In many embodiments, a visual image may be a color image and/or an RGB image (and the references to visual image may in some embodiments be replaced by references to color image or RGB image).

Alternatively or additionally, the image sensor may be a depth sensor providing a real-time sequence of depth-images/frames. For such depth images, each pixel value may represent a depth/distance to an object in a view direction of the pixel. For example, each pixel value may be a disparity or depth value. A depth image may also be referred to as a depth map.

Thus, in different embodiments, the frames/images received from the image sensor may be e.g. visual/color images, infrared images, depth images, radar images, multispectral images, sonar images, phase images, phase difference images, intensity images, coherence magnitude images, and/or confidence images. The sequency of images/frames may thus be a two-dimensional structure of pixels comprising values representing a property of the real world in a view direction for the pixel.

In many embodiments, the apparatus will be arranged to process both visual and depth images and the first receiver 201 may be arranged to receive both a sequence of real-time visual images of the real-world scene and a sequence of real-time depth images of the real-world scene. In many embodiments, the images may be combined visual-depth images and the first receiver 201 may be arranged to receive a sequence of real-time depth and visual images of the real-world scene.

It will be appreciated that many different sensors and approaches for generating visual and/or depth images are known and that any suitable approach and image sensors may be used. For example, a conventional video camera may be used as an image sensor for generating visual images. Depth images may for example be generated using a dedicated depth camera such as an infrared ranging camera, or may e.g. be generated by disparity estimation based on e.g. two visual cameras with a known physical offset.

The image sensor(s) are capturing a real world scene and thus the received images comprise a capture of this real world scene. For example, for many AR applications, the received images may be of a real world scene corresponding to the environment of the user. As a specific example, a user may wear an AR headset or glasses that also comprises one or more image sensors for capturing the real world scene in the direction that the viewer is looking.

The apparatus further comprises an image generator 203 which is arranged to generate and output visual image sequence which comprises an image object representing a virtual scene object. The output visual image sequence may be presented to a user using a suitable display, such as a display (or displays) of and AR headset or AR glasses. Thus, the user when presented with the output visual image sequence will perceive the image object to correspond to virtual object that is present in the real world scene.

The image generator 203 may adapt the image object (e.g. orientation in image, position in image, view direction etc.) in response to changes in user pose (position and/or orientation) as e.g. provided by data received from suitable movement sensors. Thus, the presentation of the image object may be such that it provides the impression of a virtual object being present in the real world scene being viewed.

In some embodiments, the generated output visual image sequences may include only the virtual object (or the virtual objects in case more than one is included) and may e.g. be presented using see-through glasses allowing the real-world scene to be seen through the glasses. Such an approach is known as an AR see-through application.

In other embodiments, the output visual image sequence may be generated to also include a presentation of the real world scene as captured by the image sensors. Thus, in such an approach, the real-world scene may also (and only) be viewed via the generated images. Such an approach is known as an AR pass-through application.

It will be appreciated that many different approaches are known for generating such AR images and for adapting and modifying generated image objects to provide an impression of a virtual object being present in a real-world scene, and for brevity such features will not be described in further detail. It will be appreciated that any suitable approach may be used without detracting from the invention. For example, algorithms and approaches from developed AR toolkits may be used, such as for example processes from ARKit or ARCore.

The image generator 203 may thus generate an image object such that it is perceived that a virtual scene object is added to the real-world scene. In many embodiments, the virtual scene object may be moveable with respect to at least one real-world scene object, and typically the virtual scene object may be moveable with respect to the whole real-world scene. For example, the virtual scene object may be moved as a function of a user action, a property of the real-world scene changing, a predetermined movement to create a predetermined effect etc.

The apparatus further comprises a detector 205 which is arranged to detect an interaction between the virtual scene object and a real world scene object of the real world scene. The detector 205 may specifically detect that a collision or contact occurs between the virtual scene object and a real world scene object. Other possible interactions may for example be a detection of a proximity of the virtual scene object and the real world scene object, or a duration of contact which may be a time interval(s) in which we are sure that the virtual and real world object have touched each other. Another example of an interaction is when it rains in the real world and raindrops fall onto the virtual object. Another example is when an air-flow is generated in the real world and the air is flowing towards the virtual object.

The detector 205 may thus detect the interaction between the virtual scene object and the real world scene object of the real world scene in response to a detection of a proximity between the virtual scene object and the real world scene object. The detection of the proximity may be in accordance with any suitable proximity criterion.

The detection of a proximity between the virtual scene object and the real world scene object may be a detection of a distance between a position of the real world scene object and a position of the virtual scene object meeting a proximity criterion. The detection of a proximity between the virtual scene object and the real world scene object may be a detection of a distance between a position of the real world scene object and a position of the virtual scene object being less than a threshold. Positions and distances may be determined in a scene coordinate system for the real world scene. The virtual scene object may be an object that is presented/displayed as if it were a real world scene object present in the real world scene.

In some embodiments, the detector 205 may determine a (first) position of the real world scene object in a (scene) coordinate system (for the scene) and a (second) position of the virtual scene object in the coordinate system. The detector 205 may detect an interaction in response to, and specifically if, the (first and second) positions meet a proximity criterion. Specifically, the detector 205 may detect an interaction in response to, and specifically if, a distance (in accordance with any suitable distance measure) between the (first and second) positions meet a distance proximity criterion, and specifically if the distance is less than a threshold.

The image generator may be arranged to generate the image object to represent a virtual scene object as an object having a given pose/spatial presence in the real world scene/the scene coordinate system. The proximity may be determined in response to a position indicative of this pose/spatial presence in the real world scene/the scene coordinate system and a position of the real world scene object in the real world scene/the scene coordinate system. The proximity may be determined in response to a position of this virtual scene object/spatial process in the real world scene/the scene coordinate system and a position of the real world scene object in the real world scene/the scene coordinate system.

Different approaches for detecting interactions may be used in different embodiments depending on the desired operation and performance for the specific embodiment and various approaches will be described later.

The detector 205 is coupled to an estimator 207 which is arranged to determine a material property for the scene object with which the virtual scene object has been detected to interact with. The material property may be an indication of the material/matter/stuff of which the real time object is made (including material composition in case the object comprises different materials). The material property may for example be generated to indicate whether the real world object is made of one of a plurality of categories, such as e.g. whether it is made of wood, cloth, metal, plastic etc.

The estimator 207 is arranged to determine the material property in response to the image data received from the image sensors, i.e. it is determined in response to data of the sequence of image frames received from the sensors. In many embodiments, the sequence of image frames may comprise both depth and visual image data and the estimator 207 may be arranged to estimate the material property in response to both depth and visual image data. In other embodiments, the estimator 207 may consider only visual data or depth data.

It will be appreciated that different algorithms and approaches may be used for estimating the material property in different embodiments. It will also be appreciated that in many embodiments, even a very inaccurate and unreliable estimation of material properties may be useful and may provide an improved user experience.

As a low complexity example, the estimator 207 may for example be arranged to determine the material property by applying a color based segmentation to received visual images and to determine an image object that is considered to match the real time image object. It may then compare the average color to a set of predefined categories to find a category with a closest match. The material property of the real time image object may then be set to a material property associated with the closest category. As a simplistic example, if the real world image object is determined to be predominantly brown, it may be estimated to be made from wood, if it is predominantly silver it may be estimated to be metal, if it is predominantly a bright primary color, it may be estimated to be plastic etc.

It will be appreciated that in most embodiments, a more complex and more accurate approach for estimating the material property may be used, and further examples will be described later.

The apparatus further comprises a second receiver 209, which is arranged to receive a number of audio objects as well as metadata for the audio objects. The audio objects may be a sound/audio clips/audio fragments and may specifically be an audio signal of a limited duration. It will be appreciated that any representation and format may be used by the audio objects to represent the sound. The audio objects may thus correspond to sounds that can be selected by the apparatus and rendered to provide a sound output when various actions occur.

Specifically, the apparatus comprises a selector 211 which is arranged to select an audio object out of the received audio objects when an interaction between the virtual scene object and a real world audio object is detected. The selected audio object is fed to an output circuit 213 which is arranged to generate an output audio signal comprising the first audio object. Thus, the output circuit 213 may render the selected audio object by generating an output audio signal which includes a rendering of the audio object.

It will be appreciated that the output circuit 213 may, dependent on the format of the audio object, in some cases simply generate the output signal as the audio of the audio object, may in some embodiments include a decoding of the audio object, may generate the output audio signal to include a mix between various audio components (e.g. ambient sound, narrator audio, etc.) to be combined with the audio object, etc., It will also be appreciated that the output circuit 213 may for example include Digital to Analog conversion and analog signal amplification in embodiments where the output circuit 213 may generate an analog output audio signal, e.g. to directly drive loudspeakers.

The output circuit 213 may include rendering processing of the audio object by, e.g., binaural processing with Head Related Impulse Responses (HRIRs), Head Related Transfer Functions (HRTFs) or Binaural Room Impulse Responses (BRIRs), or rendering to a loudspeaker configuration by, e.g., Vector Based Amplitude Panning (VBAP), and/or further acoustic simulation of, for example: occlusion, diffractions, reflections, reverberation, source extent, etc. Specifically, the rendering processing may be configured such that the sound of the audio object is perceived to originate from the location of the detected interaction.

In some embodiments, the output circuit 213 may include a timing adaptation to control a timing of the rendering of the selected audio object, such as specifically a possibly variable delay. For example, a delay between a time of the 'visual' contact/interaction and a time of rendering the sound may be included. The delay may for example be adjusted based on the speed of sound and the distance between the virtual object and the observer, e.g. to ensure that the generated sound is perceived simultaneously to the visual interaction. In some embodiments, such time adjustment may be performed at other parts of apparatus than the output circuit 213.

The metadata received by the second receiver 209 includes metadata that is indicative of links between at least some of the audio objects and material characteristics. The metadata may for example for each audio object indicate a material of a real world object that it is linked with. For example, the metadata may indicate that one audio object is linked to a real world object being made out of wood, that another audio object is linked to a real world object being made out of metal, that another audio object is linked to a real world object being made out of plastic, etc.

As will be described in more detail later, in many embodiments, the metadata may include other further links, such as e.g. a linking of audio objects to virtual scene objects, to material characteristics of virtual scene objects, types of interaction etc.

The selector 211 is in response to the detector 205 detecting an interaction between the virtual scene object and a real world scene object arranged to select an audio object based on the estimated material property for the real world scene object and the metadata indicating a link between audio objects and material characteristics.

In a low complexity embodiment, the selector 211 may simply select the audio object for which the estimated material property and the linked material characteristic match, e.g. if the estimated property is "wood", the audio object linked to "wood" is selected and a corresponding output audio signal is then generated.

The apparatus may generate an improved user experience in many embodiments and may in particular provide a more immersive and naturally sounding experience where the perceived audio may more closely reflect the interactions of the virtual scene object with real world objects. For example, rather than merely accompanying interactions, such as collisions, between virtual scene objects and real world objects with standardized audio, the apparatus may provide an audio output that more closely matches the visual perception of the user and may provide a closer correspondence between the visual and audio inputs perceived by the user. This may be achieved by the apparatus adapting and generating audio that more closely matches the interactions.

The system may for example use recorded or synthesized multiple audio objects/clips/fragments provided for a virtual scene object. Each audio fragment may model the interaction with a specific class of real world objects that could occur in the scene. At run-time, the apparatus may use a built in camera to classify e.g. the surface on which the virtual object is placed, and based on the classification result, the apparatus may play the correct audio fragment for the specific interaction.

In some embodiments, the second receiver 209 may be arranged to receive the audio objects and/or the metadata from an internal source. However, in many embodiments, the second receiver 209 may be arranged to receive the metadata, and often the audio objects, from a remote server, such as specifically the server 103 of FIG. 1.

For example, a remote server may maintain a large library of audio objects corresponding to a variety of possible interactions between objects, and may further maintain metadata which includes e.g. data that defines the material property of the objects involved in the interaction, properties of the interaction, etc.

At initialization of the application, or at a repetition rate, the second receiver 209 may retrieve the metadata for all audio objects. When an interaction is detected by the detector 205, the estimator 207 may estimate the material property of the real-world scene object and the selector 211 may evaluate the metadata to find a matching audio object. It may then proceed to control the second receiver 209 to retrieve the selected audio object from the server 103 and when received, the audio apparatus may generate the audio signal to include the received audio object.

In some embodiments, such an approach may be too slow for real-time operation and the second receiver 209 may in some embodiments retrieve a subset or possibly all audio objects from the remote server 103 and store them locally for fast retrieval. For example, in some embodiments, an analysis of the real world scene may be made on start-up, and/or at regular intervals, with the apparatus detecting as many objects as possible. The apparatus may then proceed to retrieve all audio objects for objects or materials corresponding to those detected in the real world scene, and/or corresponding to the virtual scene objects active or located nearby the user position. In other embodiments, a user may e.g. at initialization provide an input of the real world scene (e.g. living room, sports arena etc.) and the apparatus may proceed to retrieve a set of audio objects that are stored in the apparatus as possible objects in such an environment.

The approach may thus provide an efficient approach for allowing a central server to interact with remote device apparatuses to provide audio support for AR applications. It is appreciated that the central server as mentioned above could also be represented by a relatively local server, such as a 5G edge server.

In the approach, the virtual scene object is presented to the user such that it may be perceived to be present in the real world scene, and thus it is associated with a spatial (typically three dimensional) geometry/shape in the real world scene. The detector 205 may be arranged to detect the interaction as a detection that a distance between the virtual scene object and the real world scene object in the three dimensional real world space is less than a given threshold, or specifically that they come into contact with each other. In some cases, further considerations may be taken into account, such as the speed at which the objects are moving towards each other etc.

For example, some toolkits developed to support AR applications provide 3D plane surface detection where via feature point tracking over time, planar regions are detected via the specific motion that a cluster of feature points follow over time.

In some embodiments, the detector 205 may be arranged to detect an interaction by tracking the shortest distance between any vertex in a bounding mesh of the virtual graphics scene object and any one of the planes detected:

$$d(t) \equiv \min_{i \in V}\left(\min_{j \in P}(dist(x_j(t), x_i(t)))\right)$$

where $i \in V$ denotes vertex i from the set of all vertices V present in the bounding mesh of the virtual scene object, $j \in P$ is the plane for which the shortest distance is calculated and the function $dist(x_j(t),x_i(t))$ evaluates this distance. It should be noted that both the virtual scene object bounding mesh and the image sensors are generally in motion which means that vertex positions in the mesh and positions on the detected planes, and hence also the final shortest distance d(t), all vary with time.

An interaction may be detected to have occurred if the distance is less than a threshold. Specifically, a collision may be detected to have occurred if the distance is less than a small threshold, or e.g. that it reaches zero.

In some embodiments, and interaction, and specifically a collusion, may be detected to have occurred when the minimum distance of a vertex to a plane has decreased to within a minimum threshold distance $\Delta_{collision}$ and the instantaneous object speed v(t) exceeds a given minimum threshold $v_{min}$:

$$(d(t) \le \Delta_{collision}) \wedge (v(t) > v_{min})$$

The reasoning behind the speed condition is that it tends to be difficult in practice to determine whether an actual collision occurred when the object speed is low since the virtual object may come to a stop just in front of or besides a detected surface. Useful parameter values are for example $\Delta_{collision}$=5 mm and $v_{min}$=0.05 m/s.

The estimator 207 may then proceed to determine the material property for the real world scene object with which the interaction has been detected to occur. In many embodiments, the detection may be based on the estimator 207 determining an interaction image region in at least one of the input image frames, where the interaction image region is an image region of the image frame in which the interaction occurs. Thus, the estimator 207 may determine a two dimensional region in the image frame which includes the contact point between the objects detected by the detector 205. For example, the projection of the contact point on the two dimensional image frame may be determined and a region around this may be identified.

In some embodiments, the image region may for example be a predetermined shape which is centered around the projected contact point. In other embodiments, the image region may be adapted to the image properties. For example, the image region may be identified as a region around the projected contact point which meets a similarly criterion, such as that the visual properties and/or depth does not deviate from the properties of the projected contact point by more than a predetermined amount.

The estimator 207 may then determine the material property for the scene object in response to image data of the interaction image region. For example, color and texture variations may be compared to corresponding properties of a predetermined set of classes and the material property may be set to the property of the closest matching class.

In many embodiments, the material property may be determined in response to a comparison of an image property determined for the image data to a plurality of image property references, each image property reference being linked with a material property value. The image property may be determined in response to/as a material property value linked with a matching image property reference of the plurality of image property references. A matching image property reference may be determined as one for which the image property and the matching image property reference meet a match criterion. The image property may be a brightness and/or color and/or texture property.

Figure 3:
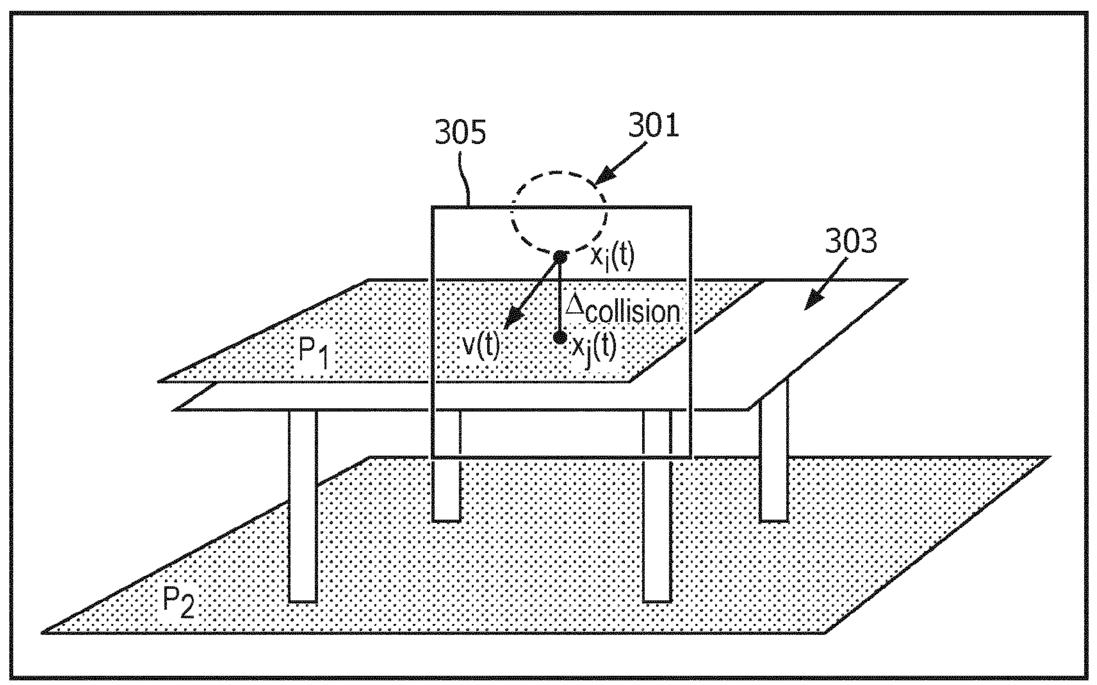
FIG. 3 illustrates an example of an image of a real world scene with a virtual scene object.

Specifically, once a collision is detected, the image interaction region may be determined. This may be done by first projecting the nearest mesh point $x_i$ into the image using the camera view matrix and the camera projection matrix. The resulting 2D image point $(u_i, v_i)$ is then used to determine a sub-image of fixed size, centered on $(u_i, v_i)$, from the camera image. FIG. 3 illustrates an example of an image frame where a virtual scene object 301 in the form of a ball may interact with a real world scene object 303 in the form of a real world table resulting in a detection of an image region 305.

The estimator 207 may in many embodiments be arranged to determine a match indication for the real world scene object to at least a first category/class out of a plurality of object categories/classes. The estimator 207 may for example have a number of properties stored for image regions corresponding to a specific material, such as color, texture variations, depth variations etc. The estimator 207 may determine corresponding properties for the image region and compare these to the stored properties for all the categories. A match indication may be determined to reflect how well the properties match, and the category may be selected as the category for which the match indication indicates a highest match.

The material property for the real world scene object may then be selected as the stored property for the selected category or class. Thus, each of the categories/classes is associated with one or more material properties, such as simply an indication of the material an object is made of, and the material property of the real world scene object is set to that stored for the selected category.

It will be appreciated that in many embodiments, the estimator 207 may use substantially more complex approaches for determining the material property for the real world scene object, and specifically to identify a class or category considered to most closely match the properties of the image region corresponding to the image region.

Indeed, in many embodiments, the estimator 207 may comprise a neural network arranged to estimate the material property of the real-world scene object based on image data of the interaction image region. The neural network may specifically be used to identify a category or class for the real world scene object.

In many embodiments, an extracted (image) interaction region may have a much smaller size than the full image. Where the full image often has a size of 2K or 4K, the interaction sub-image can have a constant smaller size of e.g. 256×256 pixels.

A color image of e.g. 256×256 pixels may be represented as a tensor of dimensions 3×256×256 and fed into a trained classifier neural network. Output of the neural network may be a vector with for each pre-defined material class providing the probability that the image belongs to the given class.

The following object (surface) classes may be particularly advantageous in many embodiments:

Ground surface carpet (short height variation of material)
Ground surface carpet (long height variation of material will suppress collision sound)
Ground surface stone
Ground surface wood
Table surface glass
Table surface wood
Wall
Couch
Cushion
Plastic surface of house-hold objects (thee cooker, keyboard, laptop computer)

Each of these classes may have specific color and texture statistics or may be differentiated due to their bounding geometry (e.g. table or cushion).

As training dataset, images from the different object surfaces may be captured and manually annotated with a ground truth class label.

For the neural network architecture, an option may be to use as a basic block a 2D convolution layer that doubles the number of channels, followed by a 2D mean pooling layer (stride=2) and a rectified linear as activation. Each block downscales the spatial resolution of the tensor with a factor 2 but doubles the number of channels. The approach may continue to connect these blocks until the tensor has resolution N-channels×1×1. Two full connected layers may then be added followed by a sigmoid activation function.

If the maximum of all class probabilities is below a given threshold (0.5 seems an appropriate value in many embodiments), then a default (neutral) interaction sound may be played, i.e. a default audio object may be selected if the estimator 207 is not able to sufficiently accurately determine the material of the real world scene object. In all other cases, the audio object/sound file may be selected by the selector 211, such as specifically the audio object corresponding to the material that has the highest probability as determined by the categorization.

In some embodiments, the apparatus may further comprise an audio receiver 215 for receiving an audio signal of real time audio captured in the real world scene and the estimator 207 may be arranged to determine the match indication in response to the audio signal.

Thus, material classification may be aided by audio-based classification, which records sounds in the physical space with a microphone. If interactions occur between physical objects, the resulting sound may give valuable information to the classification of the material or more specific properties. It may be used to provide better material classification, or provide further attributes of the material (solid/hollow, thin/thick, tensioned/slack, large/small).

For example, current and recent past environmental sound $S_{env}$ may be captured over a short time window (say 10 seconds) and may be fed into the material classifier. For example, a user holding a smartphone or wearing an AR headset, or other people may be walking in the room and the sound of their shoes on the ground may give information about the ground surface material. A material classifier can be produced by collecting images and sounds for different materials. A more advanced neural network as discussed above would then concatenate pieces of the audio fragments with the captured images and use those as input for the trained network.

As a specific example, in some embodiments, the determination of the material property may be in response to depth image data, and specifically the estimator may be arranged to determine the material property for the real world scene object in response to a detection that at least part of an image region of the at least one image frame representing the real world scene object has a confidence level for depth image data that does not exceed a threshold.

Depth estimates are often generated with confidence data that is indicative of the reliability of the generated depth values/estimates. For example, for disparity estimation, the confidence level may be determined to reflect how closely the image regions forming the basis for the disparity estimation match in the images. As another example, for a depth camera, e.g. based on reflections of infrared light, the confidence level may be generated to reflect the amount of infrared light that is received for a given pixel. If only a small amount of light is received, the distance estimation/ranging process may not be as accurate as if a large amount of light is received. In some cases, each pixel of a depth image/map may comprise both an estimated depth value as well as a confidence value/level indicating how reliable the depth value for the pixel is considered to be.

In some embodiments, this depth confidence data may be taken into account when determined the material property. For example, some materials may be known to provide a reduced confidence level compared to other materials. For example, some materials may vary a lot in local visual appearance which may make disparity estimation less reliable.

As another example, for depth estimation based on reflected light, and specifically reflected infrared light, emitted from the sensor, some materials may result in much reduced confidence due to the amount of light reflected back to the sensor being substantially reduced. This may for example be the case for materials which do not reflect but have a high absorption of infrared light. It may also be particularly the case for materials that exhibit specular reflection (e.g. a metal object) in which case very little infrared light is reflected back to the transmitter and sensor. Note that for an active depth sensor based on time-of-flight or structured light, the infrared light sensor (e.g. CMOS) is often co-located with the light transmitter/emitter. At the same time, visual light received from the metal surface may, due to the reflection of ambient light by the surface, be quite substantial. In many embodiments, the estimator 207 may for example detect that an area of the interaction image region has a low depth confidence but is quite bright. Such an area may be indicative of a highly reflective yet dispersive surface, such as a metallic surface.

In some embodiments, the image frame comprises visual image data and depth image data, and the estimator 207 may be arranged to determine the real world scene object to have a metallic component in response to a detection that for at least part of the image region a brightness of the visual image data exceeds a threshold and a confidence level for depth image data does not exceed a threshold.

As described previously, the metadata may be received from a remote source and may comprise links between audio objects and a material property for an object, which specifically may be the real world scene object. However, in some embodiments, the metadata may comprise links to material properties of two objects, and indeed may differentiate between the virtual scene object and real world scene object. In such cases, the selector 211 may select the audio object based on both the estimated material property of the real world scene object and also based on a material property of the virtual scene object. As the virtual scene object may be a virtual object generated by the apparatus, the material this object is intended to be perceived to be made from will typically be known. In this case, the audio object may thus be selected to match both properties as closely as possible.

Thus, in some embodiments, the metadata for at least some audio object comprises indications of links between the at least some audio objects and material characteristics of real world scene objects and links between the at least some audio objects and material characteristics of virtual scene objects. In such systems, the selector 211 may be arranged to select the audio object in response to the material property and material characteristics of real world objects linked to the set of audio objects and in response to a material property of the virtual scene object and material characteristics of virtual scene objects linked to the set of audio objects.

As an example, the remote server 103 may provide a two dimensional structure linking audio objects to material properties. An example of such a structure is the following two dimensional look-up table:

| Virtual object | Detected real-world material | | | |
|---|---|---|---|---|
| material | Wood | metal | concrete | unknown |
| wood | WoodOnWood | WoodOnMetal | WoodOnConcrete | WoodOnUnknown |
| metal | MetalOnWood | MetalOnMetal | MetalOnConcrete | MetalOnUnknown |
| rubber | RubberOnWood | RubberOnMetal | RubberOnConcrete | RubberOnUnknown |

In other embodiments, the metadata may provide links to other features and the selection of the audio object may take such additional features into account.

For example, in many embodiments a dynamic property of the virtual scene object may further be considered. In such embodiments, the metadata may indicate that different audio objects are linked to different states/properties of the virtual scene object. The states/properties of the virtual scene object may change dynamically, and the selection may further take the current state/property into account when finding a matching audio object.

For example, a deflated virtual ball generates a different sound than an inflated virtual ball. In some embodiments, the virtual scene object of a ball may be included twice in the look-up table, once deflated and once inflated, with each being linked to a different audio object/sound effect.

Further attributes of the virtual object may influence the selection or generation of an appropriate sound effect. For example, the orientation of the virtual object may cause different sound effects.

The virtual scene object may for example have different types of surfaces, such as e.g. a cube having different surface properties for the different sides. In such a case, the orientation of the virtual scene object may determine which surface collides with the real world scene object and the selection of the audio object may take the orientation into account.

As a specific example, the look-up-table may comprise different entries for different orientations and thus selection of the audio object may include selecting the entry corresponding to the current orientation. Virtual scene objects may be represented by a mesh, where each face, or face group, is associated with an object orientation range, virtual material property, or subset of audio objects.

Finally, further attributes of the real world scene object could be detected and used in the selection or generation of sound effects. An open door may sound different to a closed door. Or a glass sounds different when it contains liquid.

In some embodiments, the selection of the audio object may further be in response to a property of the interaction, such as specifically dependent on the type of interaction. Thus, in some embodiments, the detector 205 may be arranged to determine a property of the interaction and the selector 211 may be arranged to select the first audio object in response to the property of the interaction.

Thus, in some embodiments, attributes of the interaction itself may influence the selection or generation of a sound effect. The speed or strength of an interaction may cause different sounds, as physical collisions may be non-linear with the intensity of the collision (e.g. bouncing balls, glass may break at certain collision intensity, etc.). Other examples are direction of collision, or non-collision interactions such as sliding/rubbing of a virtual object across a physical surface.

As specific examples, the interaction property that is further considered for the selection of the audio object may be one or more of the following:

- A speed of the interaction: The detector 205 may for example determine the relative speed between the virtual scene object and the real world scene object and may select the audio object based on this. For example, a slow ball hitting a floor may have a different sound than one which is hitting the floor at much higher speed. The look-up-table may for example have different entries for different speed ranges with each entry linking to audio objects that represent recordings of balls hitting the suitable floor material with different speeds. As an example, the interaction detection may include a speed vector which is compared to the physical surface orientation and optionally its behavior shortly after the interaction allows detection of the interaction type. For example, if the object speed vector is perpendicular and towards the physical surface, the interaction may be considered an 'impact' or 'attach' interaction type. A speed vector alongside the object surface would result in a 'slide' interaction type. Such different interaction types may be linked to different audio objects.
- A force of a collision between the virtual scene object and the real world scene object. The force may for example be determined as a function of a current speed and an estimated or assumed weight of at least one of the virtual scene object and the real world scene object. Different force impacts may lead to different sounds and different audio objects may be provided and selected based on the force.
- An elasticity of a collision between the virtual scene object and the real world scene object. For example, when hitting a floor, a ball pumped to a high pressure may sound different to a ball that is partly deflated. The elasticity of the balls may be different and result in very different sounds. In some embodiments, in particular, different audio objects may be provided for different elasticities of the virtual scene object, and the metadata may include data allowing the audio objects to be differentiated based on such an elasticity.
- A duration of the interaction: For example, the apparatus may include, or communicate with, a physics engine that predicts an updated trajectory of the virtual scene object after the detected interaction with the real world object. The predicted trajectory may yield a duration of the interaction due to momentum, inertia, direction- or elasticity of the interaction or virtual and real-world materials involved in the interaction. A long duration of the interaction may result in an audio object with a long or nominal duration, while a shorter duration may result in an audio object with a shorter duration, or shorter rendering of the nominal audio object.
- In other examples, the interaction may be driven by the user interacting with the virtual content, such as dragging the virtual scene object through the real world environment. The interaction may last as long as the user has the virtual scene object in proximity, or in (virtual) contact, with the real world object.
- A direction of movement of the virtual scene object relative to the real world scene object. For example, sliding a virtual object while touching along a real-world wooden surface will generally produce a more high-pitched sound than when hitting the real-world wooden surface locally in the direction parallel to the surface normal.

In many embodiments, the metadata may be provided in the form of a look-up-table which may be multidimensional depending on how many properties may/should be taken into account when selecting the audio object. For example, a look-up-table with the following dimensions may be provided:

- Dimension 1: Virtual material
- Dimension 2: Detected real-world material
- Dimension 3: Type of interaction (e.g. impact/slide/bounce/attach/detach)
- Dimension 4: Speed of interaction In some embodiments, a metadata table may be provided which basically links two material types to each sound effect. However, there may be many sound effects for the same materials and even interaction type (material 1, material 2 and type of interaction). Based on this information, they may all be suitable for representing a certain interaction. One approach is to always pick the first, but the experience may be more compelling if a sound effect is chosen at random. For repetitive interactions, small differences in the audio makes it sound less artificial. The choice between sound clips can even be varied based on attributes of interaction that are not covered in the library's metadata (e.g. speed, or direction of impact, or the nth bounce of a ball).

Figure 4:
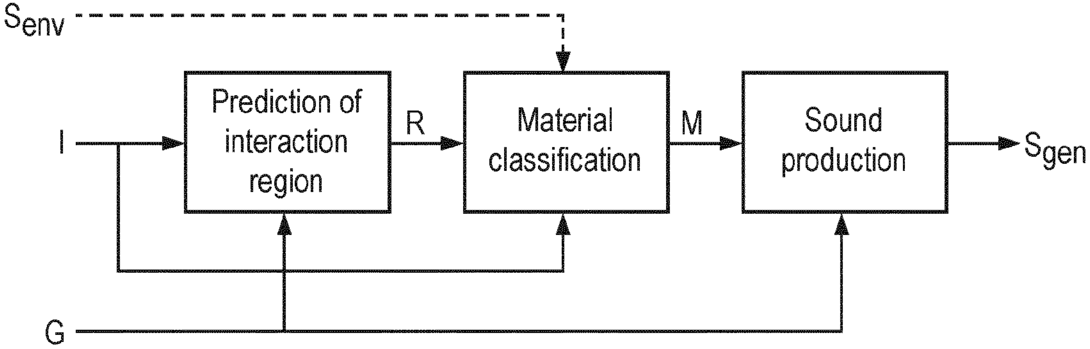
FIG. 4 illustrates an example of an approach for generating an output audio signal in accordance with some embodiments of the invention.

A specific approach of the apparatus of FIG. 2 is represented by the flow-diagram of FIG. 4. In the example, a current video image/is analyzed to predict an image region where the interaction is likely to happen. This analysis may be based on the 3D position information of the virtual scene object/graphics object G. The image part from the resulting spatial image region R in which the virtual scene object is likely to collide with a real world object of the real environment is then fed to a material classifier (the estimator 207) which determines a material class M. Finally, depending on material class M and the virtual scene object/graphics object G a sound is produced.

Surface material classification based on visual information only is likely to be sufficient for the application in many practical implementations and uses. Further, if no matching category or sound is identified, a default interaction sound for the virtual scene object G may be used instead of one specific to the material of the real world object. Optionally, current and recent past environmental sound $S_{env}$ can be fed into the material classifier.

The approach may for example allow an application where a pre-recorded sound starts to play as soon as a collision between a virtual scene object and a real world scene object occurs. Instead of specifying for each virtual object, the interaction sounds with all possible real world materials each virtual object may be given a material property and a single look-up table may be used as the basis for selecting the appropriate sound. An 'unknown' class may be used to still produce an approximately correct sound when the material classifier does not produce high enough probabilities for any of the pre-defined classes. For instance, a virtual rubber ball will make more or less the same sound when hitting different real-world surfaces.

An AR Standard may provide syntax for a bitstream with audio-, visual- and metadata for virtual elements to augment specific physical areas. The Standard may allow the user to interact with these virtual elements in the physical environment. In order to have audio augmentation of these interactions, the Standard may provide means for transmitting many sound effect clips to the decoder with these not being rendered to the user unless they are triggered.

A provided bitstream may include a metadata indicative of a multi-dimensional lookup table that assigns every sound effect clip to an entry in that lookup table. Each dimension of the table may correspond with an aspect of an interaction between a virtual element and a physical element. When an interaction has aspects (e.g. detected by classification and/or logical algorithms) present in this lookup table that jointly identify a certain table entry, a sound effect clip associated with this table entry can be played at the position of the interaction between the physical and virtual element.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

There may be provided a computer program product comprising instructions which, when the program is executed by a computer, cause the computer to carry out [the steps of] the method of claim 13.

EMBODIMENTS

Claim 1. An apparatus for generating an output audio signal, the apparatus comprising:

a first receiver (201) arranged to receive a real time image sequence of a real world scene from an image sensor, the real time image sequence comprising a sequence of image frames, each image frame comprising at least one of visual image data and depth image data;

a second receiver (209) arranged to receive a set of audio objects and metadata for audio objects of the set of audio objects, the metadata being indicative of links between audio objects of the set of audio objects and material characteristics;

an image generator (203) arranged to generate an output image sequence comprising an image object corresponding to a virtual scene object in the real world scene;

a detector (205) arranged to detect an interaction between the virtual scene object and a real world scene object of the real world scene;

an estimator (207) arranged to determine a material property for the real world scene object in response to image data of the sequence of image frames;

a selector (211) arranged to select a first audio object of the set of audio objects in response to the material property and the material characteristics linked to audio objects of the set of audio objects; and an output circuit (213) arranged to generate the output audio signal comprising the first audio object.

Claim 2. The apparatus of claim 1 wherein the estimator (207) is arranged to determine an interaction image region in at least one image frame of the sequence of image frames, the interaction image region being an image region of the at least one image frame in which the interaction occurs; and determine the material property for the scene object in response to image data of the interaction image region.

Claim 3. The apparatus of claim 1 or 2 wherein the second receiver (209) is arranged to receive the metadata from a remote server.

Claim 4. The apparatus of any previous claim wherein the metadata for at least some audio objects comprises indications of links between the at least some audio objects and material characteristics of real world scene objects and links between the at least some audio objects and material characteristics of virtual scene objects; and wherein the selector (211) is arranged to select the first audio object in response to the material property and material characteristics of real world objects linked to the set of audio objects and in response to a material property of the virtual scene object and material characteristics of virtual scene objects linked to the set of audio objects.

Claim 5. The apparatus of any previous claim wherein the selector (211) is arranged to select the first audio object in response to a dynamic property of the virtual scene object.

Claim 6. The apparatus of any previous claim wherein the detector (205) is arranged to determine a property of the interaction and the selector (211) is arranged to select the first audio object in response to the property of the interaction.

Claim 7. The apparatus of claim 6 wherein the property of the interaction is at least one property selected from the group of:

a speed of the interaction;

a force of a collision between the virtual scene object and the real world scene object;

an elasticity of a collision between the virtual scene object and the real world scene object;

a duration of the interaction; and a direction of movement of the virtual scene object relative to the real world scene object.

Claim 8. The apparatus of any previous claim wherein the selector (211) is arranged to select the first audio object in response to an orientation of the virtual object relative to the real world scene object.

Claim 9. The apparatus of any previous claim wherein the estimator (207) is arranged to determine a match indication for the real world scene object to at least a first category out of a plurality of object categories; and to determine the material property in response to the match indication and material properties linked to the object categories.

Claim 10. The apparatus of claim 9 further comprising an audio receiver (215) for receiving an audio signal of real time audio captured in the real world scene, and wherein the estimator is arranged to determine the match indication in response to the audio signal.

Claim 11. The apparatus of any previous claim wherein the selector (211) is arranged to select the first audio object as a default audio object if no audio object is detected for which a selection criterion is met.

Claim 12. The apparatus of any previous claim wherein at least one image frame comprises depth image data and wherein the estimator (207) is arranged to determine the material property for the real world scene object in response to a detection that at least part of an image region of the at least one image frame representing the real world scene object has a confidence level for depth image data that does not exceed a threshold.

Claim 13. A method of generating an output audio signal, the method comprising:

receiving a real time image sequence of a real world scene from an image sensor, the real time image sequence comprising a sequence of image frames, each image frame comprising at least one of visual image data and depth image data;

receiving a set of audio objects and metadata for audio objects of the set of audio objects, the metadata being indicative of links between audio objects of the set of audio objects and material characteristics;

generating an output image sequence comprising an image object corresponding to a virtual scene object in the real world scene;

detecting an interaction between the virtual scene object and a real world scene object of the real world scene;

determining a material property for the real world scene object in response to image data of the sequence of image frames;

selecting a first audio object of the set of audio objects in response to the material property and the material characteristics linked to audio objects of the set of audio objects; and generating the output audio signal comprising the first audio object.

Claim 14. A computer program product comprising computer program code means adapted to perform all the steps of claim 13 when said program is run on a computer.

Claim 15. An audio signal comprising a set of audio objects and metadata for the audio objects, the metadata being indicative of links between audio objects and material characteristics for a real world object.

The invention claimed is:

1. An apparatus comprising:

a first receiver, wherein the first receiver is arranged to receive a real time image sequence of a real world scene from an image sensor, wherein the real world scene comprises at least one real world scene object and at least one virtual scene objects, wherein the real time image sequence comprises a sequence of image frames, wherein each image frame comprises image data, wherein the image data comprises at least one of a visual image data and a depth image data;

a second receiver, wherein the second receiver is arranged to receive a plurality of audio objects, wherein the second receiver is arranged to receive at least one metadata, wherein the at least one metadata is for at least one of the plurality of audio objects, wherein the at least one metadata is indicative of links between the at least one of the plurality of audio objects and real material characteristics;

an image generator circuit, wherein the image generator circuit is arranged to generate an output image sequence, wherein the output image sequence comprises an image object, wherein the image object corresponds to the at least one virtual scene objects;

a detector circuit, wherein the detector circuit is arranged to detect an interaction, wherein the interaction is between the at least one virtual scene objects and the at least one real world scene object in response to a detection of a proximity between the at least one virtual scene objects and the at least one real world scene objects;

an estimator circuit, wherein the estimator circuit is arranged to determine a real material property of the at least one real world scene object in response to image data;

a selector circuit, wherein the selector circuit is arranged to select a first audio object of the plurality of audio objects in response to the real material property and to the real material characteristics; and an output circuit arranged to generate an output audio signal comprising the first audio object.

2. The apparatus of claim 1, wherein the estimator circuit is arranged to determine an interaction image region in at least one image frame of the sequence of image frames, wherein the interaction image region is an image region of the at least one image frame in which the interaction occurs, wherein the estimator circuit is arranged to determine the real material property for the scene object in response to image data of the interaction image region.

3. The apparatus of claim 1, wherein the second receiver is arranged to receive the at least one metadata from a remote server.

4. The apparatus of claim 1, wherein the at least one real world scene objects have real material characteristics, wherein the at least one metadata comprises indications links between the at least of the plurality of audio objects and virtual material characteristics of the at least one virtual scene objects, wherein the selector circuit is arranged to select the first audio object in response to the real material property and real material characteristics and in response to a virtual material property and the virtual material characteristics of the at least one virtual scene objects linked to the plurality set of audio objects.

5. The apparatus of claim 1, wherein the selector circuit is arranged to select the first audio object in response to a dynamic property of the at least one virtual scene objects.

6. The apparatus of claim 1, wherein the detector circuit is arranged to determine a property of the interaction, wherein the selector circuit is arranged to select the first audio object in response to the property of the interaction.

7. The apparatus of claim 6, wherein the property of the interaction is selected from the group consisting of a speed of the interaction, a force of a collision between the at least one virtual scene objects and the at least one real world scene object, an elasticity of a collision between the at least one virtual scene objects and the at least one real world scene object, a duration of the interaction and a direction of movement of the at least one virtual scene objects relative to the at least one real world scene object.

8. The apparatus of claim 1, wherein the selector circuit is arranged to select the first audio object in response to an orientation of the virtual object relative to the at least one real world scene object.

9. The apparatus of claim 1, wherein the estimator circuit is arranged to determine a match indication to at least a first category for the at least one real world scene object, wherein a plurality of object categories comprises the first category, wherein the estimator circuit is arranged to determine the real material property in response to the match indication and at least one material properties, wherein the at least one material properties is linked to the object categories.

10. The apparatus of claim 9, further comprising an audio receiver, wherein the audio receiver is arranged to receive an audio signal, wherein the audio signal comprise a real time audio captured in the real world scene, wherein the estimator circuit is arranged to determine the match indication in response to the audio signal.

11. The apparatus of claim 1, wherein the selector circuit is arranged to select the first audio object as a default audio object if no audio object is detected for which a selection criterion is met.

12. The apparatus of claim 1, wherein at least one image frame of the sequence of image frames comprises depth image data, wherein the estimator circuit is arranged to determine the real material property in response to a detection that at least part of an image region of the at least one image frame representing the at least one real world scene object has a confidence level for depth image data that does not exceed a threshold.

13. A method comprising:

receiving a real time image sequence of a real world scene from an image sensor, wherein the real world scene comprises at least one real world scene object and at least one virtual scene objects, wherein the real time image sequence comprises a sequence of image frames, wherein each image frame comprises image data, wherein the image data comprises at least one of a visual image data and a depth image data;

receiving a plurality of audio objects and at least one metadata, wherein the at least one metadata is for at least one of the plurality of audio objects, wherein the at least one metadata is indicative of links between the at least one of the plurality of audio objects and real material characteristics;

generating an output image sequence, wherein the output image sequence comprises an image object, wherein the image object corresponds to at least one virtual scene objects;

detecting an interaction between the at least one virtual scene objects and the least one real world scene object in response to a detection of a proximity between the at least one virtual scene objects and the at least one real world scene objects;

determining a real material property of the at least one real world scene object in response to image data;

selecting a first audio object of the plurality of audio objects in response to the real material property and to the real material characteristics; and generating an output audio signal, wherein the output audio signal comprises the first audio object.

14. A computer program stored on a non-transitory medium, wherein the computer program when executed on a processor performs the method as claimed in claim 13.

15. The method of claim 13, further comprising:

determining an interaction image region in at least one image frame of the sequence of image frames, wherein the interaction image region is an image region of the at least one image frame in which the interaction occurs; and determining the real material property for the scene object in response to image data of the interaction image region.

16. The method of claim 13, further comprising receiving the at least one metadata from a remote server.

17. The method of claim 13, further comprising selecting the first audio object in response to the real material property and real material characteristics and in response to a virtual material property and the virtual material characteristics of the at least one virtual scene objects linked to the plurality set of audio objects, wherein the at least one real world scene objects have real material characteristics, wherein the at least one metadata comprises indications links between the at least of the plurality of audio objects and virtual material characteristics of the at least one virtual scene objects.

18. The method of claim 13, further comprising selecting the first audio object in response to a dynamic property of the at least one virtual scene objects.

19. The method of claim 13, further comprising:

determining a property of the interaction; and selecting the first audio object in response to the property of the interaction.

20. The method of claim 13, further comprising selecting the first audio object in response to an orientation of the virtual object relative to the at least one real world scene object.

* * * * *